(12) United States Patent
Koike et al.

(10) Patent No.: US 10,597,069 B2
(45) Date of Patent: Mar. 24, 2020

(54) CONTROL UNIT AND ELECTRIC POWER STEERING DEVICE EMPLOYING CONTROL UNIT

(71) Applicant: Mitsubishi Electric Corporation, Tokyo (JP)

(72) Inventors: Hisashi Koike, Tokyo (JP); Masaaki Tanigawa, Tokyo (JP); Dai Yoshii, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 147 days.

(21) Appl. No.: 15/517,847

(22) PCT Filed: Nov. 14, 2014

(86) PCT No.: PCT/JP2014/080236
§ 371 (c)(1),
(2) Date: Apr. 7, 2017

(87) PCT Pub. No.: WO2016/075821
PCT Pub. Date: May 19, 2016

(65) Prior Publication Data
US 2017/0305457 A1 Oct. 26, 2017

(51) Int. Cl.
*H02K 5/04* (2006.01)
*B62D 5/04* (2006.01)
(Continued)

(52) U.S. Cl.
CPC ............ *B62D 5/0406* (2013.01); *B62D 5/046* (2013.01); *H02K 5/04* (2013.01); *H02K 5/22* (2013.01);
(Continued)

(58) Field of Classification Search
CPC ........ B62D 5/04; B62D 5/0406; B62D 5/046; H02K 11/00; H02K 11/33; H02K 5/04;
(Continued)

(56) References Cited

U.S. PATENT DOCUMENTS 4,782,244 A * 11/1988 Wakimoto ............. H02K 5/225
307/116
5,126,608 A * 6/1992 Sogabe .................. H02K 5/225
310/71

(Continued)

FOREIGN PATENT DOCUMENTS

JP      2008-22653 A         1/2008
JP   WO 2013132584 A1 *     9/2013   ........... H02K 11/024
(Continued)

OTHER PUBLICATIONS

International Search Report for PCT/JP2014/080236 dated Feb. 10, 2015 [PCT/ISA/210].

*Primary Examiner* — Naishadh N Desai
(74) *Attorney, Agent, or Firm* — Sughrue Mion, PLLC; Richard C. Turner

(57) ABSTRACT

A connector structure that is joined to a housing so as to form the control unit includes a connector main body in which a connector is formed, a terminal including a power supply system and a signal system, and a component mounting portion including at least one of a capacitor and a coil, wherein the component mounting portion is provided parallel to a motor output shaft on the exterior of a motor or the housing, and the at least one of the capacitor and the coil included in the component mounting portion is electrically connected directly to the connector of the connector main body via the terminal.

11 Claims, 10 Drawing Sheets

(51) Int. Cl.
*H02K 11/00* (2016.01)
*H02K 5/22* (2006.01)
*H02K 11/33* (2016.01)
*H02P 27/06* (2006.01)
*H02P 6/00* (2016.01)

(52) U.S. Cl.
CPC .............. *H02K 5/225* (2013.01); *H02K 11/00* (2013.01); *H02K 11/0094* (2013.01); *H02K 11/33* (2016.01); *H02P 27/06* (2013.01); *H02P 6/00* (2013.01); *H02P 2205/01* (2013.01)

(58) Field of Classification Search
CPC ...... H02K 5/22; H02K 11/0094; H02K 5/225; H02P 27/06; H02P 2205/01; H02P 6/00
USPC ....................................................... 310/71, 89
See application file for complete search history.

(56) References Cited

U.S. PATENT DOCUMENTS

| | | | | |
|---|---|---|---|---|
| 6,078,155 | A * | 6/2000 | Tominaga | B62D 5/0406 318/293 |
| 2004/0066111 | A1* | 4/2004 | Torii | H02K 5/148 310/239 |
| 2004/0212263 | A1* | 10/2004 | Kitoh | H02K 7/1166 310/99 |
| 2011/0254393 | A1* | 10/2011 | Yamasaki | H02K 5/18 310/64 |
| 2012/0161590 | A1* | 6/2012 | Yamasaki | H02K 5/225 310/68 B |
| 2012/0229005 | A1* | 9/2012 | Tominaga | B62D 5/0406 310/68 B |
| 2014/0091683 | A1* | 4/2014 | Ito | B62D 5/0406 310/68 R |
| 2014/0153198 | A1* | 6/2014 | Yamasaki | H05K 7/1432 361/747 |
| 2014/0300304 | A1* | 10/2014 | Omae | H02K 11/024 318/400.24 |

FOREIGN PATENT DOCUMENTS

| | | |
|---|---|---|
| JP | 2013-207960 A | 10/2013 |
| JP | 5377710 B2 | 12/2013 |
| JP | 2014-131463 A | 7/2014 |
| WO | 2013/038572 A1 | 3/2013 |
| WO | 2013/132584 A1 | 9/2013 |

* cited by examiner

CONTROL UNIT AND ELECTRIC POWER STEERING DEVICE EMPLOYING CONTROL UNIT

CROSS REFERENCE TO RELATED APPLICATIONS

This application is a National Stage of International Application No. PCT/JP2014/080236, filed on Nov. 14, 2014, the contents of all of which are incorporated herein by reference in their entirety.

TECHNICAL FIELD

This invention relates to a control unit that controls driving of a motor and is integrated with the motor so as to be coaxial with a motor output shaft, and an electric power steering device that employs this control unit.

BACKGROUND ART

A control unit that controls driving of a motor includes a plurality of connectors provided in accordance with a large number of sensors and a power supply system. Further, in a control unit that is integrated with a motor so as to be coaxial with a motor output shaft, specifications of the connectors, such as the orientation, type, and shape thereof, must be modified in accordance with the object to which the control unit is to be attached.

Hence, a method of configuring a control unit (a control device) by providing a connector as an individual constituent component and attaching the connector to a housing of the control unit has been proposed (see PTL 1, for example).

More specifically, the control unit described in PTL 1 includes a closed end cylinder-shaped housing having a housing projecting portion that projects in a radial direction and includes a housing hole portion, a control portion that is housed in the housing and includes a control portion connection terminal into which an external signal is input from the exterior of the housing and an electronic component that performs calculation processing on the external signal, a heat sink that closes an opening portion of the housing and includes a heat sink hole portion formed in a heat sink projecting portion that projects in the radial direction, an external connection connector that is fixed to one of the housing projecting portion and the heat sink projecting portion and includes a connector connection terminal that is electrically connected to the control portion connection terminal, and a cover that is fixed to the other of the housing projecting portion and the heat sink projecting portion, wherein the connector connection terminal and the control portion connection terminal are passed through the portion, among the housing hole portion or the heat sink hole portion, that is covered by the cover and electrically connected to each other by respective tip end portions thereof.

With the control unit described in PTL 1, having the configuration described above, modifications to the specifications of the connector can be dealt with simply by modifying the design of the external connection connector, and therefore the housing and other members are not affected thereby.

CITATION LIST

Patent Literature

[PTL 1] Japanese Patent No. 5377710

SUMMARY OF INVENTION

Technical Problem

However, the prior art includes the following problems.

In the control unit described in PTL 1, the external connection connector and the periphery thereof can still be improved in terms of complexity, size, ease of assembly, and cost. Further, comparatively large components must be mounted in the control unit, and when these large components are disposed, it becomes difficult to achieve a reduction in size.

This invention has been designed to solve the problems described above, and an object thereof is to obtain a control unit with which modifications to the specifications of a connector can be dealt with easily, and a configuration of the connector and the periphery thereof can be simplified, enabling an improvement in ease of assembly and reductions in size and cost.

Solution to Problem

A control unit according to this invention is used to control driving of a motor, and includes: a housing that is formed integrally with the motor so as to be coaxial with a motor output shaft of the motor, forms an outer covering of the control unit, and is joined to an end portion of the motor; and a connector structure that is disposed in a cutaway portion formed in the housing and joined to the housing. The connector structure includes: a connector main body in which a connector is formed; a terminal including a power supply system and a signal system; and a component mounting portion including at least one of a capacitor and a coil. The component mounting portion is provided parallel to the motor output shaft on the exterior of the motor or the housing, and the at least one of the capacitor and the coil included in the component mounting portion is electrically connected directly to the connector of the connector main body via the terminal.

Advantageous Effects of Invention

In the control unit according to this invention, the connector structure that is joined to the housing so as to form the control unit includes the connector main body in which the connector is formed, the terminal including the power supply system and the signal system, and the component mounting portion including at least one of the capacitor and the coil, wherein the component mounting portion is provided parallel to the motor output shaft on the exterior of the motor or the housing, and the at least one of the capacitor and the coil included in the component mounting portion is electrically connected directly to the connector of the connector main body via the terminal.

Therefore, modifications to the specifications of the connector can be dealt with easily, and the configuration of the connector and the periphery thereof can be simplified, enabling improvements in ease of assembly and reductions in size and cost.

DESCRIPTION OF EMBODIMENTS

Figure 1:
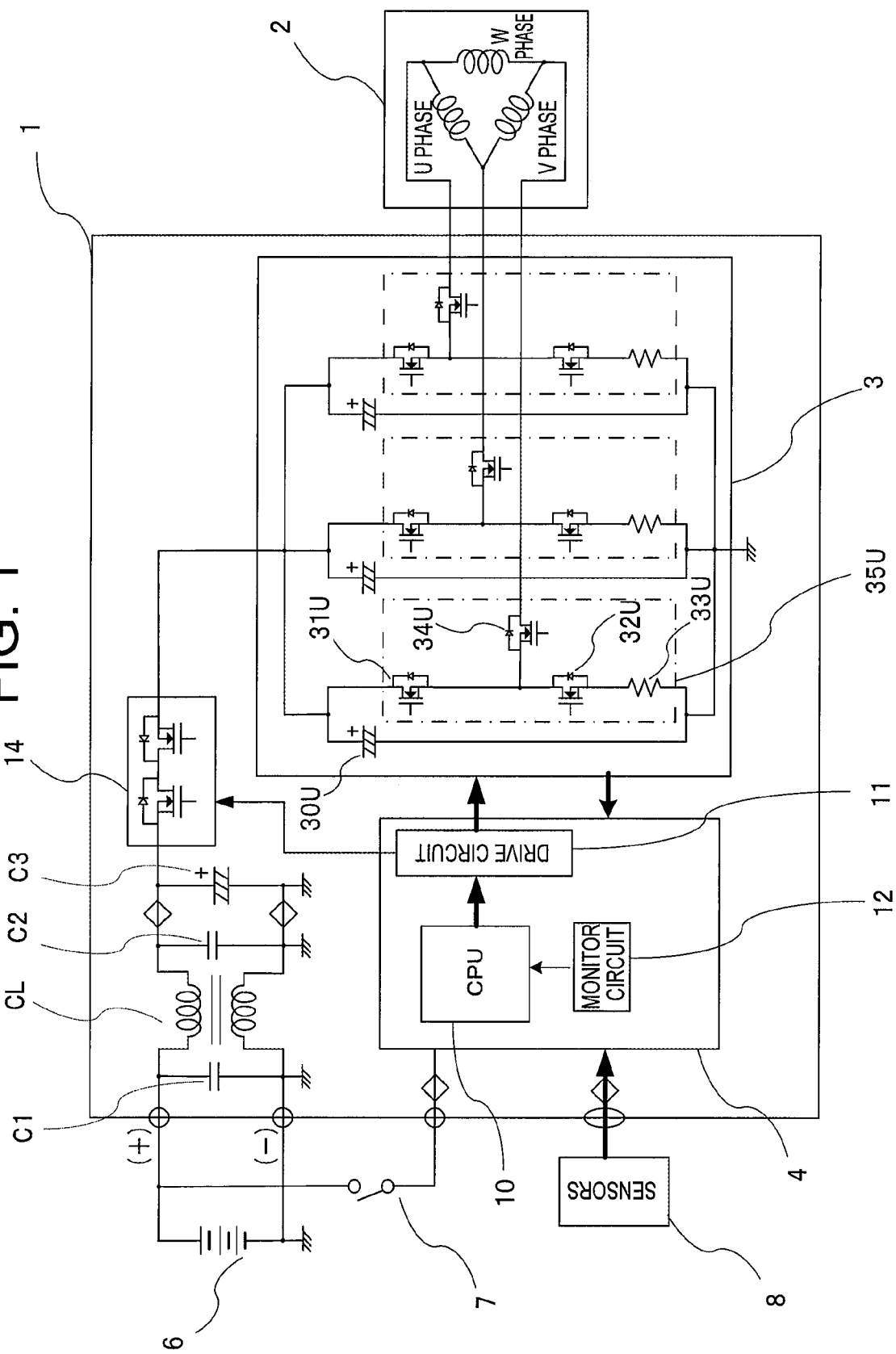
FIG. 1 is a circuit diagram showing an overall circuit configuration of an electric power steering device to which a control unit according to a first embodiment of this invention is applied.

Preferred embodiments of a control unit according to this invention will be described below using the drawings. Identical or corresponding parts of the drawings will be described using identical reference numerals. Note that the control unit according to this invention is integrated with a motor so as to be coaxial with an output shaft of the motor.

Further, a case in which the control unit is applied to an electric power steering device will be described below as an example, but the invention is not limited to this example, and as long as the control unit controls driving of a motor, the control unit need not be applied to an electric power steering device.

First Embodiment

FIG. 1 is a circuit diagram showing an overall circuit configuration of an electric power steering device to which a control unit according to a first embodiment of this invention is applied. In FIG. 1, the electric power steering device is constituted by a control unit 1 and a motor 2.

Note that in the first embodiment, a case in which the motor 2 is a three-phase brushless motor will be described, but the invention is not limited to this configuration, and the motor 2 may be a motor having a brush or any multiphase winding motor having three or more phases.

The control unit 1 includes an inverter circuit 3 that supplies a current to the motor 2, and a control board 4 installed mainly with a CPU 10. Further, the control unit 1 is connected via connectors to a battery 6, an ignition switch 7, and sensors 8 installed in a vehicle.

The control board 4 in the control unit 1 includes the CPU 10 that calculates a control amount to be applied to power supplied to the motor 2 on the basis of information from the sensors 8, which include a vehicle speed sensor and a torque sensor for detecting a steering torque of a steering wheel, an initial stage drive circuit 11 that drives the inverter circuit 3, and a monitor circuit 12 that detects voltages or currents of respective parts of the inverter circuit 3.

Further, capacitors C1, C2, C3 and a coil CL for suppressing noise radiation are provided on power supply system lines (+, −) of the control unit 1. Here, these components are comparatively large. Furthermore, a power supply switching element 14 having a relay function for opening and closing the + power supply line is interposed on the power supply system lines.

The power supply switching element 14 is a FET, for example, in which two parasitic diodes provided respectively in a forward direction and a reverse direction relative to a current supply direction are connected in series. Using the power supply switching element 14, the power supply can be cut off forcibly when a fault occurs in the motor 2 or the inverter circuit 3 or the like. Further, using the parasitic diodes, a line along which the current flows can be cut off when the battery 6 is wired in reverse, and as a result, a function for protecting the battery from reverse connection is realized.

The inverter circuit 3 includes a total of six switching elements 31U to 31W, 32U to 32W provided respectively on upper and lower arms of respective phases (U, V, W) of a three-phase winding of the motor 2, and relay switching elements 34U to 34W having a relay function for connecting and disconnecting the motor winding and the switching elements. Note that in FIG. 1, only the U phase components are shown, but the other phases are identical to the U phase.

The switching elements 31U to 31W, 32U to 32W of the upper and lower arms are PWM-driven on the basis of commands from the CPU 10, and therefore capacitors 30U to 30W are also connected to the inverter circuit 3 in order to suppress noise. Shunt resistors 33U to 33W for detecting the current flowing through the motor 2 are also connected to the inverter circuit 3. Here, a total of three switching elements 31, 32, 34 are disposed in relation to each phase so as to form integrated power modules 35U to 35W for the respective phases.

In an operation of the electric power steering device shown in FIG. 1, briefly, the CPU 10 calculates a current to be supplied to the winding of the motor 2 on the basis of input information from the sensors 8, and outputs the calculated current to the inverter circuit 3 via the drive circuit 11. Next, the switching elements 31, 32, 34 of the respective phases are driven such that the current is supplied to the winding of the motor 2.

Further, a current value of the current supplied to the winding of the motor 2 is detected by the monitor circuit 12, and feedback control is executed in accordance with a deviation between the calculation value (a target value) from the CPU 10 and the actual current value. Note that the drive circuit 11 also controls the power supply switching element 14 and the relay switching elements 34.

Figure 2:
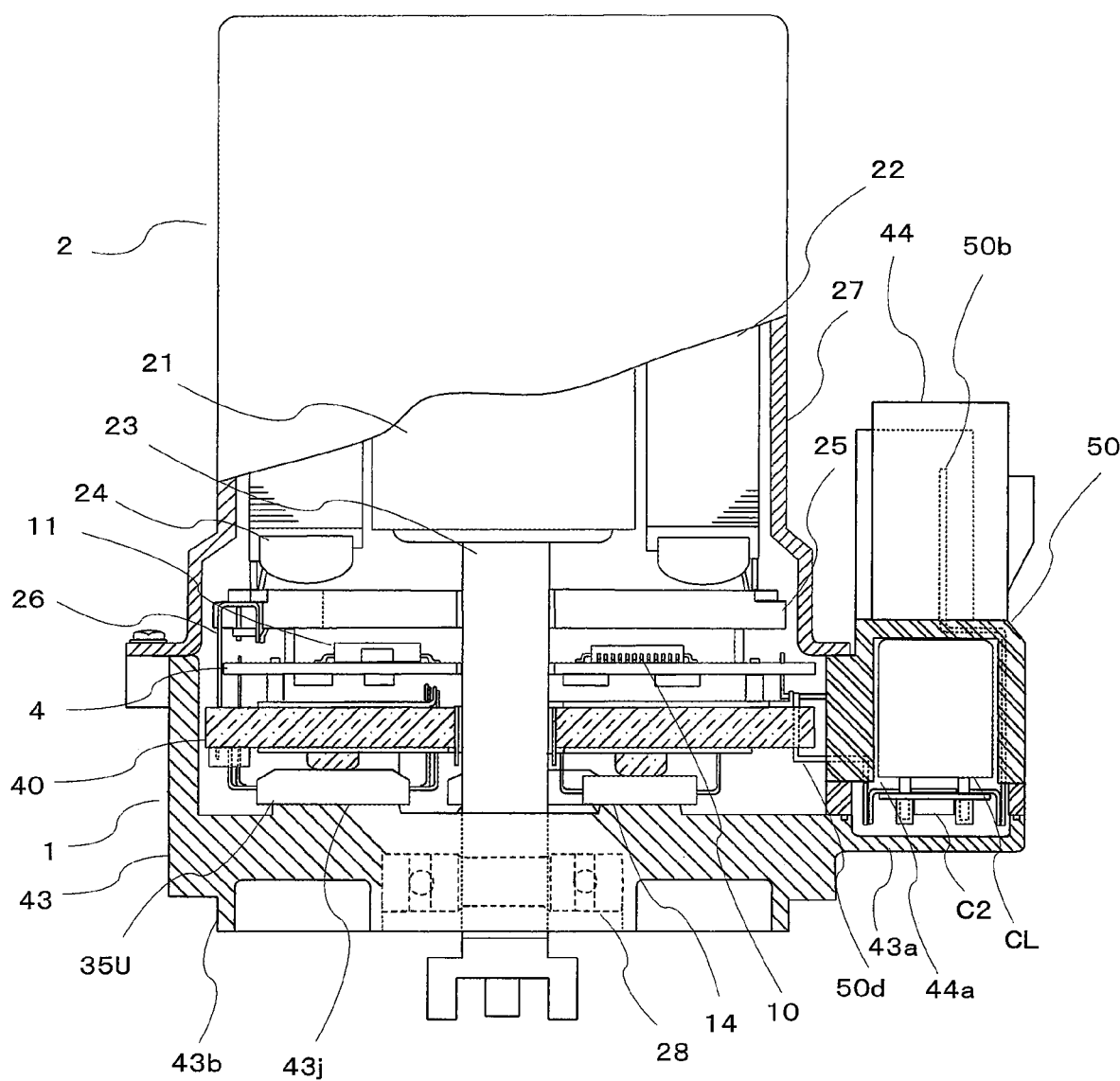
FIG. 2 is a sectional view showing the electric power steering device according to the first embodiment of this invention.

FIG. 2 shows a configuration of the electric power steering device having the circuit configuration described above. FIG. 2 is a sectional view showing the electric power steering device according to the first embodiment of this invention. In FIG. 2, the motor 2 is disposed on an upper side of the drawing, and the control unit 1 is disposed below the motor 2. Further, the control unit 1 is provided in an output direction of an output shaft 23 of the motor 2 so as to be coaxial with the motor output shaft 23.

The motor 2 is formed by disposing a rotor 21 and a stator 22 in the interior of a motor case 27. Permanent magnets, not shown in the drawing, are disposed on the rotor 21 in a plurality of pole pairs so as to surround the output shaft 23. The stator 22 is provided on the periphery of the rotor 21, and a three-phase winding 24 is wound around the stator 22. Further, an annular ring 25 is provided below the three-phase winding 24, and winding ends are delta-connected within the annular ring 25 and then led out to the control unit 1 as winding terminals 26.

The control unit 1 is formed by disposing the control board 4 installed with the CPU 10, the drive circuit 11, and so on, a frame 40, the power module 35U (35V and 35W are not shown), and the power supply switching element 14 respectively in the interior of a housing 43.

Here, the housing 43 has a cylindrical shape with a substantially identical diameter to the motor case 27, but a part thereof is cut away in order to mount connectors (connector main bodies) 44, 44c, and an extension portion 43a is formed on the cutaway portion. Further, a connector structure 50 is mounted on an upper portion of the extension portion 43a. The connector structure 50 is constituted by a power supply system connector 44, a sensor connector 44c shown in detail in FIG. 3, a component mounting portion 44a, and so on.

Furthermore, the housing 43 is joined to the motor case 27 by bolts, not shown in the drawing, for example. Moreover, the housing 43 includes a joint portion 43b that extends downward in the drawing and is joined to a speed reduction mechanism, not shown in the drawing, for transmitting the rotation of the motor output shaft 23. Further, the housing 43 holds a bearing 28 that allows the output shaft 23 to rotate freely. The control board 4 and the frame 40 are stacked in the interior of the housing 43 such that the frame 40 is disposed below the control board 4.

The frame 40 is an intermediate member made of insulating resin, in which a terminal of the power supply system connector 44, conductive plates constituting the + and − lines of the power supply system, and so on are disposed. Further, the three power modules 35 are mounted below the frame 40 such that respective lower surfaces of the power modules 35 closely contact a front surface of the housing 43. As a result, a heat dissipation performance of the power modules 35 is improved. In other words, the housing 43 is structured as described above, and to secure a favorable heat dissipation performance and ease of assembly, the housing 43 is formed from aluminum.

Figure 3:
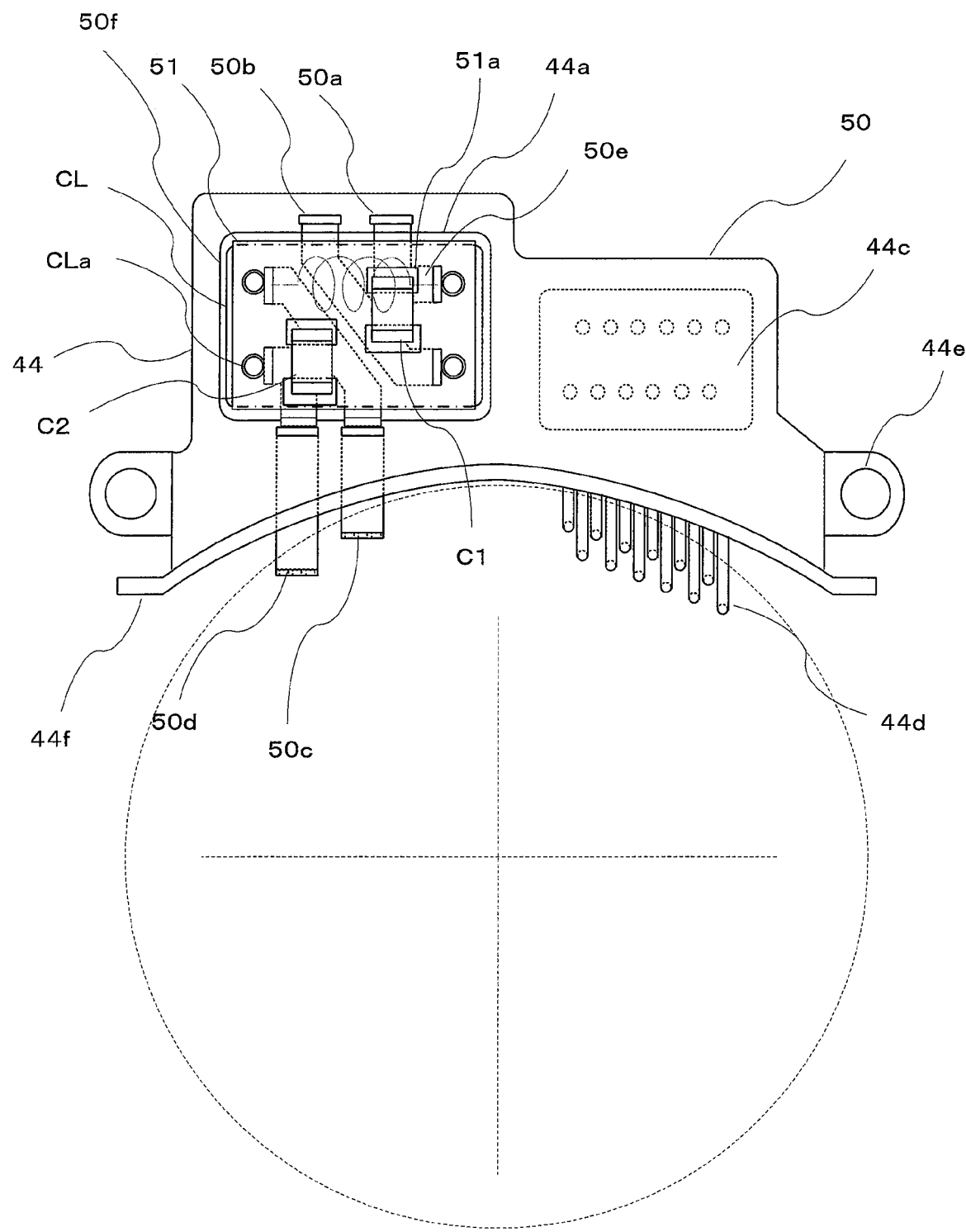
FIG. 3 is a bottom view showing a connector structure of the electric power steering device according to the first embodiment of this invention.

Next, referring to FIGS. 3 and 4, the periphery of the connector structure 50 will be described. FIG. 3 is a bottom view showing the connector structure of the electric power steering device according to the first embodiment of this invention. In FIG. 3, the connector structure 50 is constituted by the power supply system connector 44, the sensor connector 44c, the component mounting portion 44a, a first attachment portion 44e, and a second attachment portion 44f.

Sensor terminals 44d of the sensor connector 44c penetrate the connector structure 50 so as to extend to a rear surface of the drawing. Here, twelve sensor terminals 44d are provided, but the number of sensor terminals is set to correspond to each unit. Further, terminals 50a, 50b of the power supply system connector 44 and the three components constituted by the capacitors C1, C2 and the coil CL are directly connected specifically to the power supply system connector 44 of the connector structure 50.

Furthermore, a recessed portion 50f is formed in the component mounting portion 44a, and the coil CL (a dot-dash line), which has an outer shape resembling a rectangular parallelepiped, is mounted in the recessed portion 50f. Here, as shown on the circuit diagram in FIG. 1, two coils are housed as the coil CL. Moreover, leg portions CLa of the coils are denoted by four circles.

Further, in FIG. 3, a rectangular shape within the recessed portion 50f denotes a wiring board 51 which is wired so that the capacitors C1, C2 can be installed on the board. A total of four connection pads 51a used for soldering are disposed around respective terminal portions of the capacitors C1, C2.

Furthermore, four conductive plates 50e (dotted lines) are disposed on a rear surface of the wiring board 51, and respective first ends thereof are connected to power supply system terminals 50a, 50b, 50c, 50d. Respective second ends of the conductive plates 50e are connected to the leg portions CLa of the coil CL. Moreover, four holes through which the leg portions CLa of the coil CL can pass are opened in the wiring board 51.

Further, although not shown in the drawing, the connection pads 51a and the conductive plates 50e are connected as shown on the circuit diagram in FIG. 1. More specifically, the conductive plates 50e are mounted on the wiring board 51 on a main body side of the coil CL, and the connection pads 51a are mounted on the side of the capacitors C1, C2.

Here, the connectors 44, 44c and the connector structure 50 are formed from molded insulating resin. The terminals 50a, 50b of the power supply system connector 44 penetrate the power supply system connector 44 and extend through a mold on an outer periphery of the component mounting portion 44a so as to be led out from an opening side. Further, tip end portions thereof are connected by welding to the first end portions of the conductive plates 50e.

The end portions of the terminals 50c, 50d are likewise connected by welding to the first end portions of the other conductive plates 50e. The terminals 50c, 50d extend through the interior of the housing 43 so as to be led out to the control unit 1, and are then connected to the conductive plates of the frame 40.

Note that the connector structure 50 is assembled in the following order. First, the connector structure 50 is formed by insert-molding the terminals 50a, 50b, 50c, 50d, the sensor connector 44c, and the sensor terminal 44d.

Next, the wiring board 51 is manufactured such that the connection pads 51a are disposed in four locations, whereupon the separately manufactured conductive plates 50e are mounted thereon in four locations. The capacitors C1, C2 are then soldered to the connection pads 51a.

Next, the leg portions CLa of the coils are passed through the holes in the wiring board 51 and welded first to the conductive plates 50e. Next, the integrated coil CL and wiring board 51 are inserted into the recessed portion 50f of the component mounting portion 44a.

At this time, the coil main bodies are coated with an adhesive and adhered to a bottom portion of the recessed portion 50f. Further, the terminals 50a, 50b, 50c, 50d are welded to the respective first end portions of the conductive plates 50e. Finally, the connector structure 50 is mounted in the housing 43 in which the various components of the control unit 1 are housed.

Figure 4:
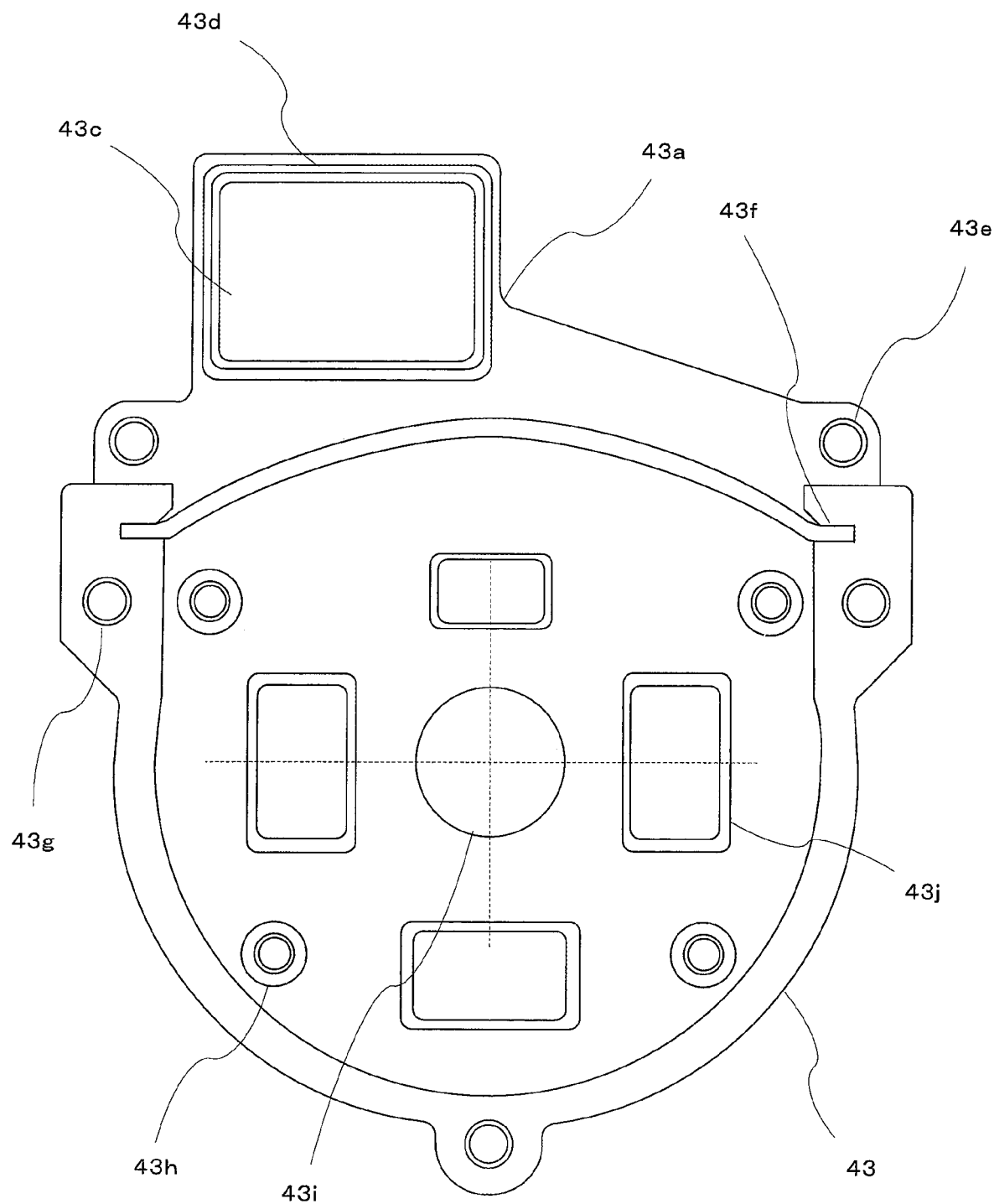
FIG. 4 is a plan view showing a housing of the electric power steering device according to the first embodiment of this invention.

FIG. 4 is a plan view showing the housing of the electric power steering device according to the first embodiment of this invention. FIG. 4 shows the housing 43 from the upper side of FIG. 2. A hole 43i having a large diameter is opened in the center of the housing 43, and the output shaft 23, not shown in the drawing, is inserted into the hole. Further, the control board 4 of the control unit 1, the power modules 35, the frame 40, and so on are installed in the housing 43, whereupon the housing 43 is attached to the motor case 27, and therefore the housing 43 has a semicircular tubular shape.

More specifically, cylindrical portions having small holes 43h opened therein are disposed in four locations of the housing 43 in order to fix the control unit 1 to the housing 43. Further, small holes 43g are provided in three locations on an outer peripheral portion in order to fix the housing 43 to the motor case 27. Furthermore, small holes 43e for fixing the connector structure 50 to the housing 43 are provided in two locations and aligned with holes in the first attachment portion 44e of the connector structure 50, whereby the connector structure 50 and the housing 43 are fastened to each other by bolts or the like.

A groove 43f is provided in the vicinity of the small holes 43e, and the second attachment portion 44f of the connector structure 50 shown in FIG. 3 is inserted into the groove 43f. Further, the connector structure 50 can be fixed securely using the small holes 43e so as to be capable of withstanding stress generated when the connectors are inserted and removed.

Here, by fitting the second attachment portion 44f to the groove 43f, the connector structure 50 can be fixed provisionally before fastening the small holes 43e and the first attachment portion 44e using bolts, and as a result, an improvement in ease of assembly can be achieved. Hence, the groove 43f serves as a positioning portion of the connector structure 50.

Furthermore, by coating the groove 43f with a sealing material, the groove 43f can be made waterproof. Note that projecting portions 43j are provided in four locations (three large and one small) of the housing 43, and these projecting portions 43j closely contact respective bottom portions of the power modules 35 and the power supply switching element 14.

Further, the extension portion 43a includes the recessed portion 43c, and serves as a lid of the component mounting portion 44a inside which the coil CL, the conductive plates, and the terminal end portions are housed. Accordingly, a groove 43d is provided on a periphery of the extension portion 43a, and the groove 43d is coated with a sealing material or an adhesive by which the extension portion 43a is attached to the connector structure 50. Note that by fixing the connector structure 50 using the small holes 43e and the first attachment portion 44e, substantially no stress is exerted on the extension portion 43a when the connectors are inserted and removed, and therefore a structure employed prior to bolt fastening, for example, is not required. As a result, a number of components employed during assembly can be reduced.

Hence, by disposing the comparatively large components that are connected to the terminals of the power supply system connector 44 so as to be directly connected to the connector main body, connecting the extended terminals to these components, and then extending the terminals into the control unit 1, the size of the control unit 1 itself can be reduced. Further, by providing the connector structure 50 as a separate member to the housing 43, modifications to the specifications of the connectors can be dealt with, meaning that modifications to the housing 43 and the interior of the control unit 1 are not required, and as a result, standardization can be achieved.

According to the first embodiment, as described above, the connector structure that is joined to the housing in order to form the control unit includes the connector main body in which the connector is formed, the terminal including the power supply system and the signal system, and the component mounting portion that includes at least one of the capacitor and the coil, wherein the component mounting portion is provided parallel to the motor output shaft on the exterior of the motor or the housing, and at least one of the capacitor and the coil included in the component mounting portion is electrically connected directly to the connector of the connector main body via the terminal.

Therefore, modifications to the specifications of the connector can be dealt with easily, and the configuration of the connector and the periphery thereof can be simplified, enabling an improvement in ease of assembly and reductions in size and cost.

Second Embodiment

Figure 5:
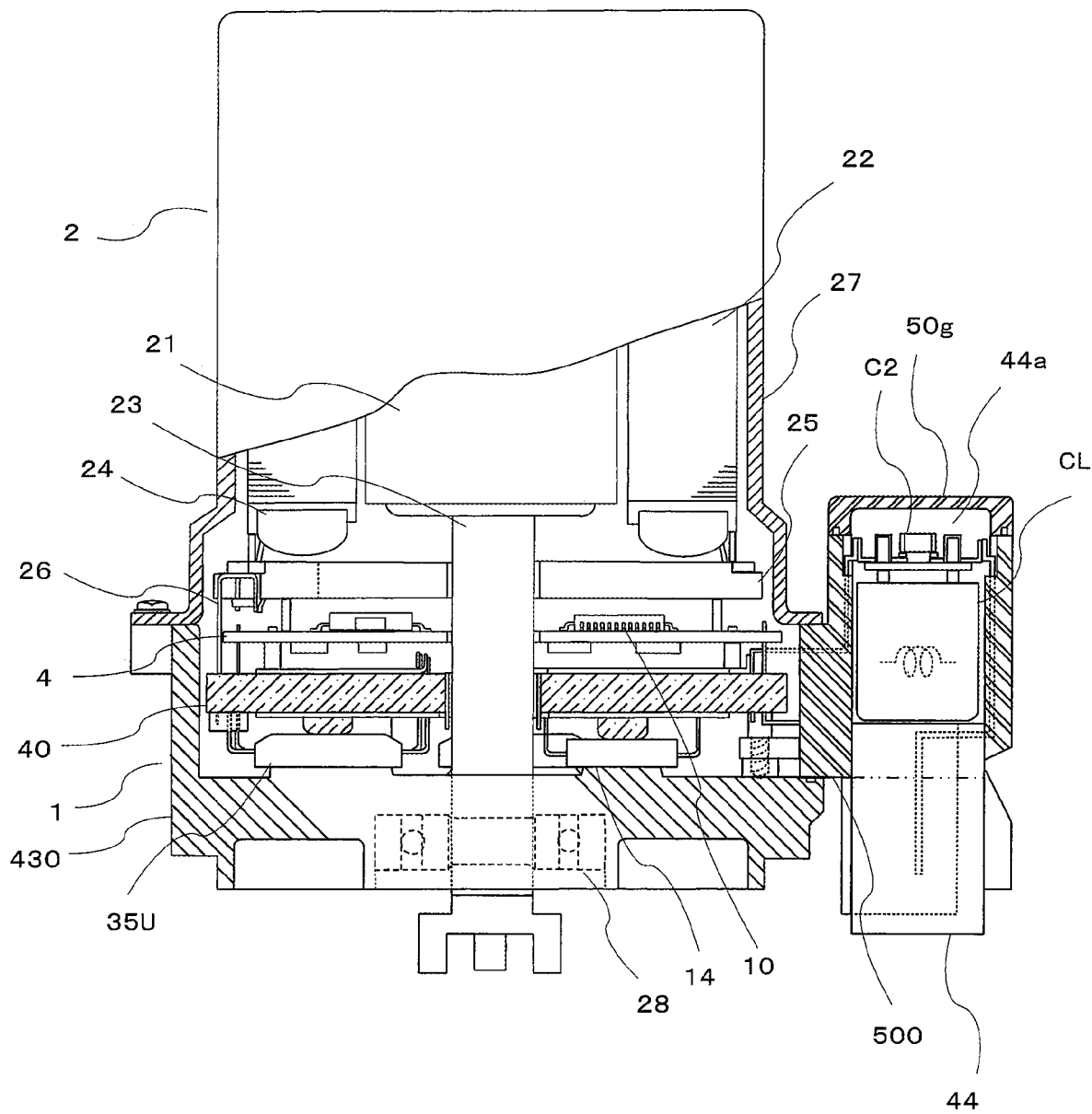
FIG. 5 is a sectional view showing an electric power steering device according to a second embodiment of this invention.

FIG. 5 is a sectional view showing an electric power steering device according to a second embodiment of this invention. Note that identical sites to FIGS. 1 to 4 have been allocated identical reference numerals. In FIG. 5, the connector 44 is disposed in an opposite orientation to that of FIG. 2, and therefore the component mounting portion 44a is disposed on the upper side of the connector structure 50 in the drawing.

In FIG. 5, a lid 50g is mounted on the component mounting portion 44a on the upper portion of the connector structure 50. The lid 50g protects the capacitors C1, C2, the coil CL, and so on, and by forming a seal between the lid 50g and the connector structure 50, a waterproof structure can be realized easily. Further, the connector structure 50 is formed from an insulating resin, and the lid 50g may be formed from an identical material. In so doing, adhesiveness and waterproofing can be secured easily.

Figure 6:
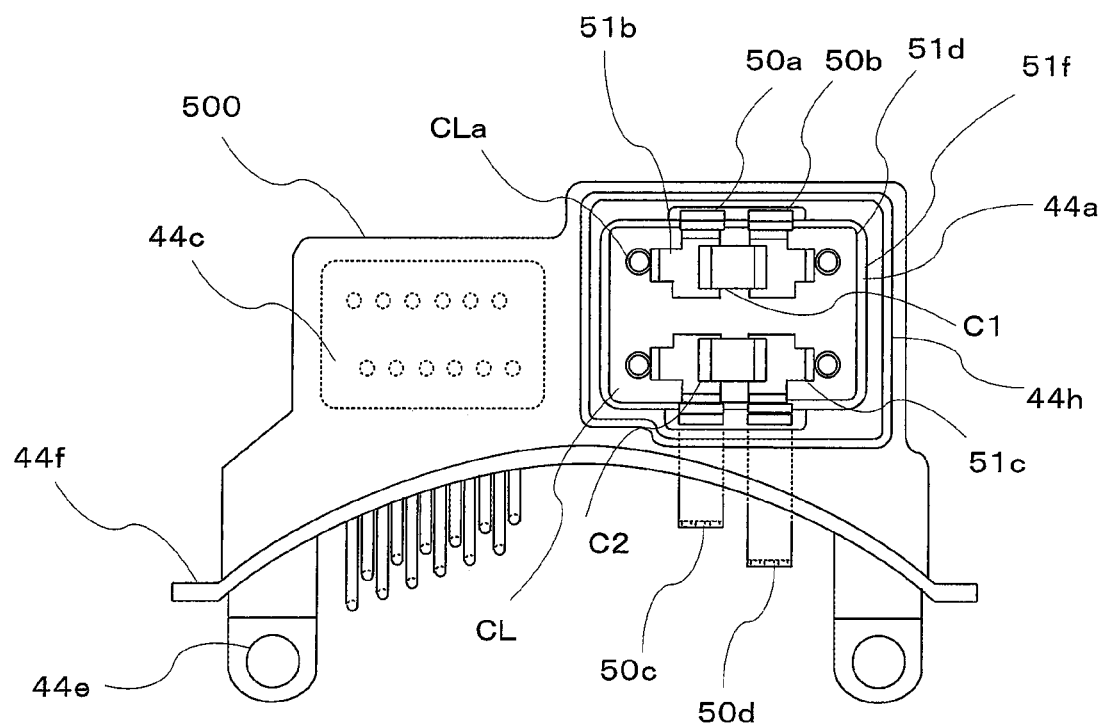
FIG. 6 is a bottom view showing a connector structure of the electric power steering device according to the second embodiment of this invention.
Figure 7:
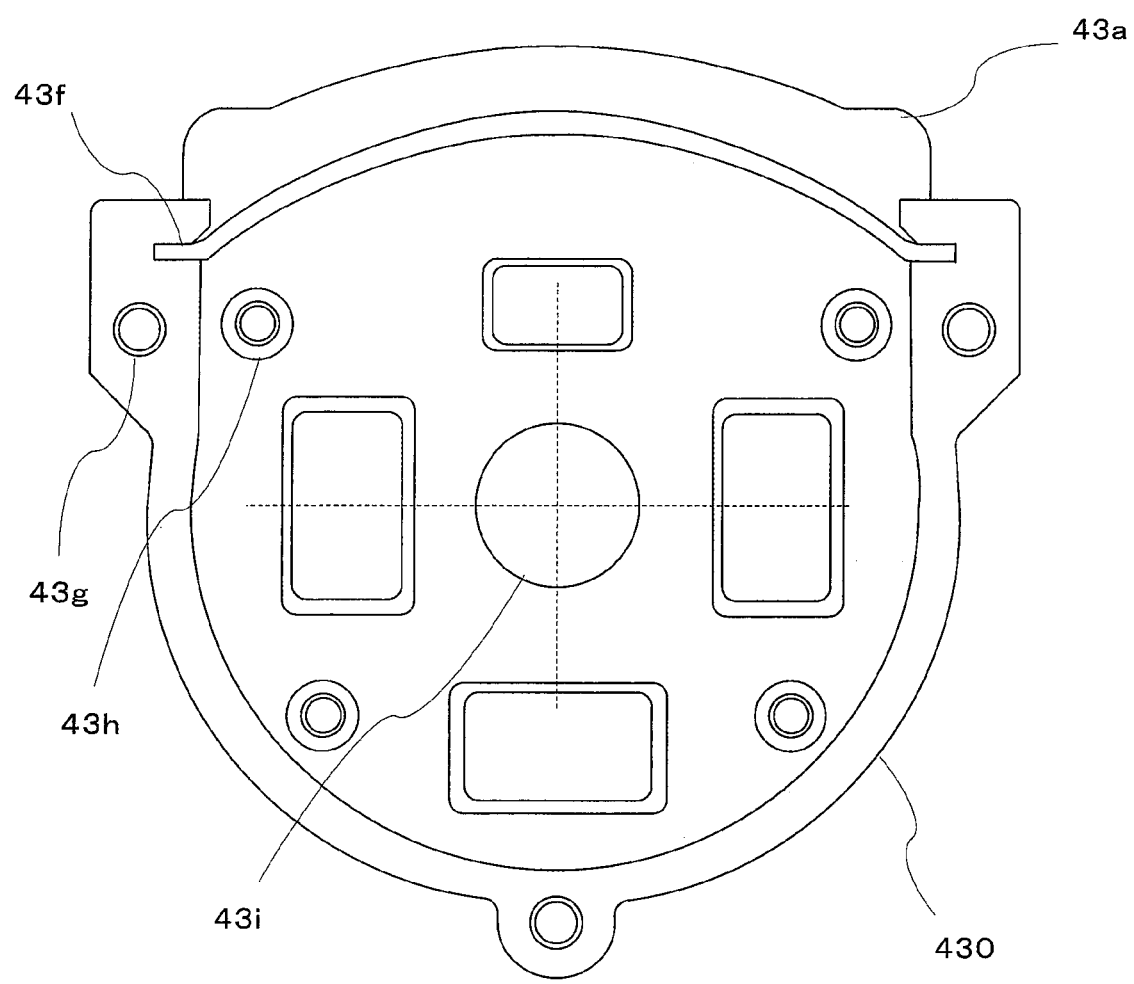
FIG. 7 is a plan view showing a housing of the electric power steering device according to the second embodiment of this invention.

FIG. 6 is a bottom view showing the connector structure of the electric power steering device according to the second embodiment of this invention, and FIG. 7 is a plan view showing a housing of the electric power steering device according to the second embodiment of this invention.

On the right side in FIGS. 6 and 7, the component mounting portion 44a of a connector structure 500 is open, and the capacitors C1, C2, the coil CL, and so on are housed in the recessed portion 51f. Further, the terminals 50a, 50b of the connector 44 are led out to the opening portion through an outer covering side, while the terminals 50c, 50d on the control unit 1 side are led out in a similar manner to the first embodiment, as shown in FIG. 3. Note that the coil CL is structured such that the two coils are disposed in different directions to the first embodiment.

Furthermore, the two small holes forming the first attachment portion 44e are opened in the connector structure 500, and using these holes, the connector structure 500 is attached to a housing 430. Moreover, similarly to FIG. 4, the four small holes 43h are opened in the housing 430, and using these holes, the frame 40 and so on of the control unit 1 are fixed. By fixing the connector structure 500 and fixing either the control board 4 or the frame 40 using the same holes, the number of bolts and the number of small holes can be reduced.

Further, an outer peripheral wall 44h is provided around the opening portion of the component mounting portion 44a, an outer peripheral recessed portion is formed in the lid 50g, and the outer peripheral wall 44h is inserted into the outer peripheral recessed portion. In so doing, a mounting area of the sealing agent or adhesive can be enlarged, and as a result, improvements in adhesiveness and waterproofing can be achieved.

Furthermore, the extension portion 43a of the housing 430 differs in size from that of the first embodiment, shown in FIG. 4. In the second embodiment of this invention, as shown in FIG. 7, no small attachment holes are formed in the extension portion 43a, and the surface area of the extension part is reduced. Here, the extension portion 43a merely overlaps a part of the connector structure 500, and in contrast to the first embodiment, does not substantially overlap a projecting portion of the connector structure.

Moreover, the extension portion 43a exists in the insertion/removal direction of the connector 44 and so on, and therefore has a small surface area.

Figure 8A:
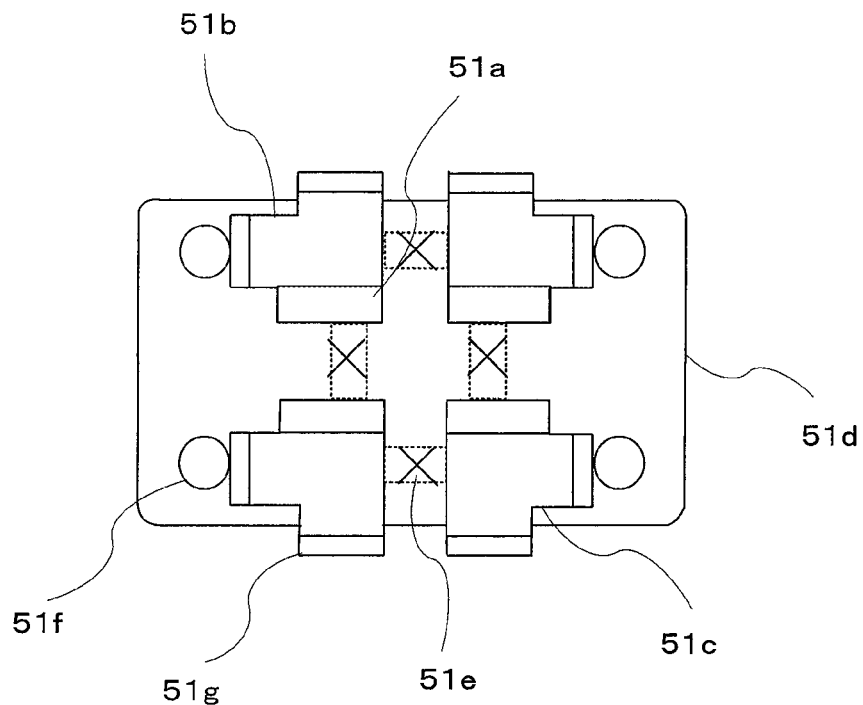
FIGS. 8A and 8B are illustrative views showing a coil connection structure of the electric power steering device according to the second embodiment of this invention.
Figure 8B:
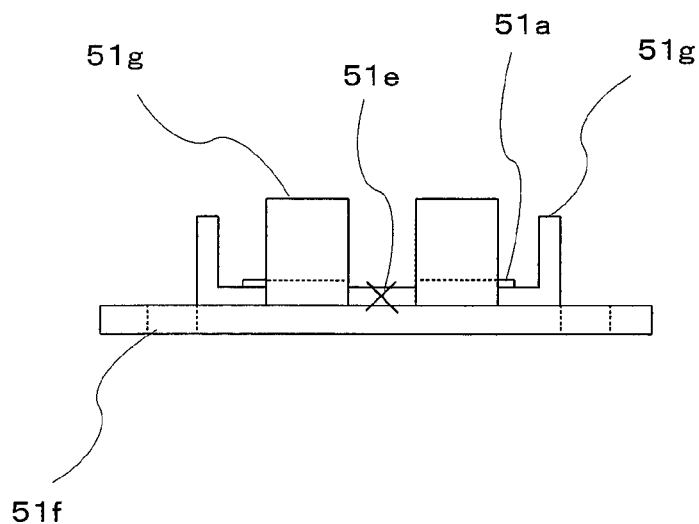

Next, referring to FIG. 8, connections and structures of the components in the interior of the component mounting portion 44a, namely the leg portions CLa of the coil CL, the terminals 50a, 50b, 50c, 50d, and the conductive plates 51b, 51c, will be described. FIG. 8 is an illustrative view showing a coil connection structure of the electric power steering device according to the second embodiment of this invention, wherein FIG. 8A is a plan view and FIG. 8B is a sectional view.

In FIG. 8, the conductive plates 51b, 51c are mounted on an insulating plate 51d. Here, the insulating plate 51d is a simple insulating resin plate, in contrast to the wiring board 51 of the first embodiment. Further, the conductive plates 51b, 51c are mounted on the insulating plate 51d by outsert molding, for example.

Furthermore, in FIG. 8, the conductive plates are copper plates respectively having bent connection ends 51g, and the respective conductive plates 51b, 51c are connected in X marks 51e (four locations) in the drawing prior to assembly. The connected conductive plates having the connection ends 51g are mounted on an upper surface of the insulating plate 51d. As regards amounting structure, the conductive plates may be press-fitted into a recessed portion corresponding to the shape of the conductive plates, or may be adhered using an adhesive. Alternatively, claw-shaped sites may be passed through the insulating plate 51d, and the conductive plates may be attached thereto.

Moreover, the connection pads 51a are provided in four locations on the conductive plates 51b, 51c. The connection pads 51a are used to mount the capacitors C1, C2, and are formed from nickel plated copper so that the capacitors C1, C2 can be soldered thereto.

Here, after mounting the conductive plates 51b, 51c on the insulating plate 51d, the insulating plate 51d is cut in the four locations of the X marks 51e. In so doing, the conductive plates 51b, 51c can be used as four independent bus bars. Further, the leg portions CLa of the coil CL, which are inserted into the four small holes 51f, are connected by welding to the connection ends 51g.

After assembling the coil CL, the insulating plate 51d, and the conductive plates 51b, 51c in this manner, the resulting assembly is mounted in the recessed portion of the component mounting portion 44a. The connection ends 51g are then connected by welding to the terminals 50a, 50b, 50c, 50d, respectively, whereby electrical connection is complete. The entire connector structure 500 is then mounted in the housing 430. Finally, the lid 50g is mounted on the component mounting portion 44a.

Hence, in the connector structure 500, the component mounting portion 44a is provided in the vicinity of the connector main body, and more specifically in a different position to the connector insertion/removal direction, and moreover, the component mounting portion 44a is disposed substantially parallel to the output shaft 23 of the motor alongside the motor 2 or the housing 430 of the control unit 1. The terminals of the connectors are extended to the component mounting portion 44a, connected to the components housed in the component mounting portion 44a, and connected to a different terminal in the direction of the control board 4, and as a result, reductions in the size of the electrical connections and the structure can be achieved.

In particular, large components are not disposed in the control unit 1, and therefore the control unit 1 can be reduced in size. As a result, the control unit 1 can be formed with a substantially identical diameter to the outer diameter of the motor 2. Further, the connector structure 500 is provided separately to and independently of the housing 430 and the motor 2, and therefore modifications to the specifications of the connectors can be dealt with simply by modifying the connector structure 500. Moreover, the components housed in the component mounting portion 44a may be modified in accordance with the specifications, but such a case can likewise be dealt with simply by modifying the design of the component mounting portion 44a, without affecting other sites. As a result, standardization can be achieved.

Note that in the first embodiment, described above, the housing is provided with the extension portion 43a, but the extension portion 43a of the housing may be omitted and the lid 50g may be used as a lid, as in the second embodiment.

Third Embodiment

Figure 9:
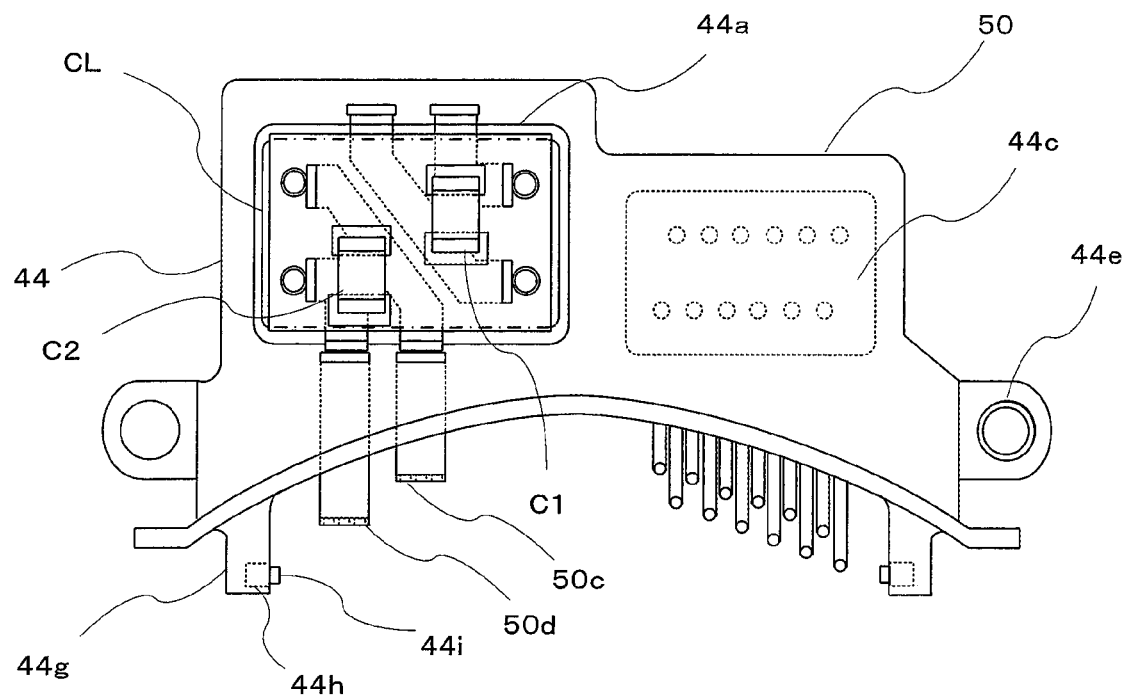
FIG. 9 is a bottom view showing a connector structure of an electric power steering device according to a third embodiment of this invention.
Figure 10:
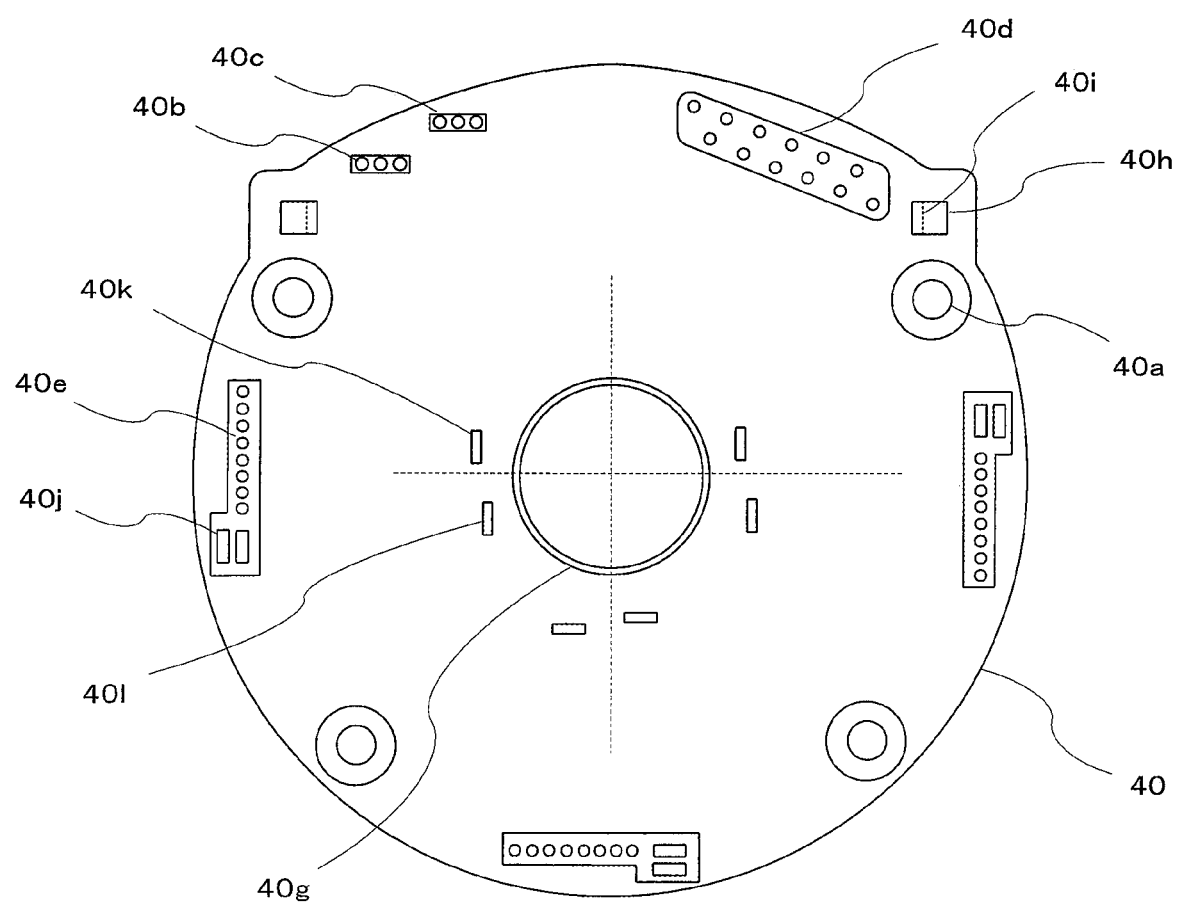
FIG. 10 is a plan view showing a frame of the electric power steering device according to the third embodiment of this invention.

FIG. 9 is a bottom view showing a connector structure of an electric power steering device according to a third embodiment of this invention, and FIG. 10 is a plan view showing a frame of the electric power steering device according to the third embodiment of this invention. Note that FIG. 9 corresponds to FIG. 3 of the first embodiment.

First, FIG. 9 differs from FIG. 3 only in relation to a support portion 44g and leg portions 44j. The leg portions 44j of the support portion 44g are provided to extend to a rear surface of the drawing, and projections 44i are formed on respective tip end portions thereof.

FIG. 10 is a plan view showing the frame 40 serving as the intermediate member. The frame 40 is formed from insulating resin, and a large diameter hole 40g for inserting the output shaft 23 is opened in the center thereof. Further, small holes 40b, 40c, 40d are opened on an upper side of the frame 40, and these holes are used for inserting the terminals 50d, 50c of the connectors and the terminal of the connector 44c. Moreover, four holes 40a are opened in the periphery of the frame 40, and these holes are used for attaching and fixing the frame 40 and the control board 4.

Furthermore, hole groups 40e are opened in three locations in the frame 40. These holes are used for control terminals of the power modules 35, square holes serving respectively as output terminal holes for the power modules 35 and holes for the motor winding ends (the winding terminal 26 in FIG. 2).

Further, sets of two square holes formed in three locations in the vicinity of the large diameter hole 40g serve as power supply (+: 40k, −: 40l) terminal end portions for the power modules 35. The power modules 35 are disposed between these holes (40e, 40j, 40k, 40l) such that electrical connections are formed between the terminals. For this purpose, the sets of square holes are disposed separately in three locations for the three power modules. The + power supply small hole 40b and the terminal end portion 40k are connected by a bus bar, while the − power supply small hole 40c and the terminal end portion 40l are likewise connected by a bus bar.

Note that two square holes 40h are opened, and the leg portions 44j extending from the support portion 44g of the connector structure 50 are inserted into these holes. The tip end projections 44i contact latch portions 40i on the square holes 40h such that the leg portions 44j are not easily dislodged.

When the connector structure 50 and the frame 40 are joined in this manner, the holes in the frame serve as guides to prevent the terminals of the connectors from bending. Further, the two components are joined by a simple fitting structure so that the two components can be handled as an integrated component after being joined, and as a result, an improvement in user-friendliness can be achieved.

Figure 11:
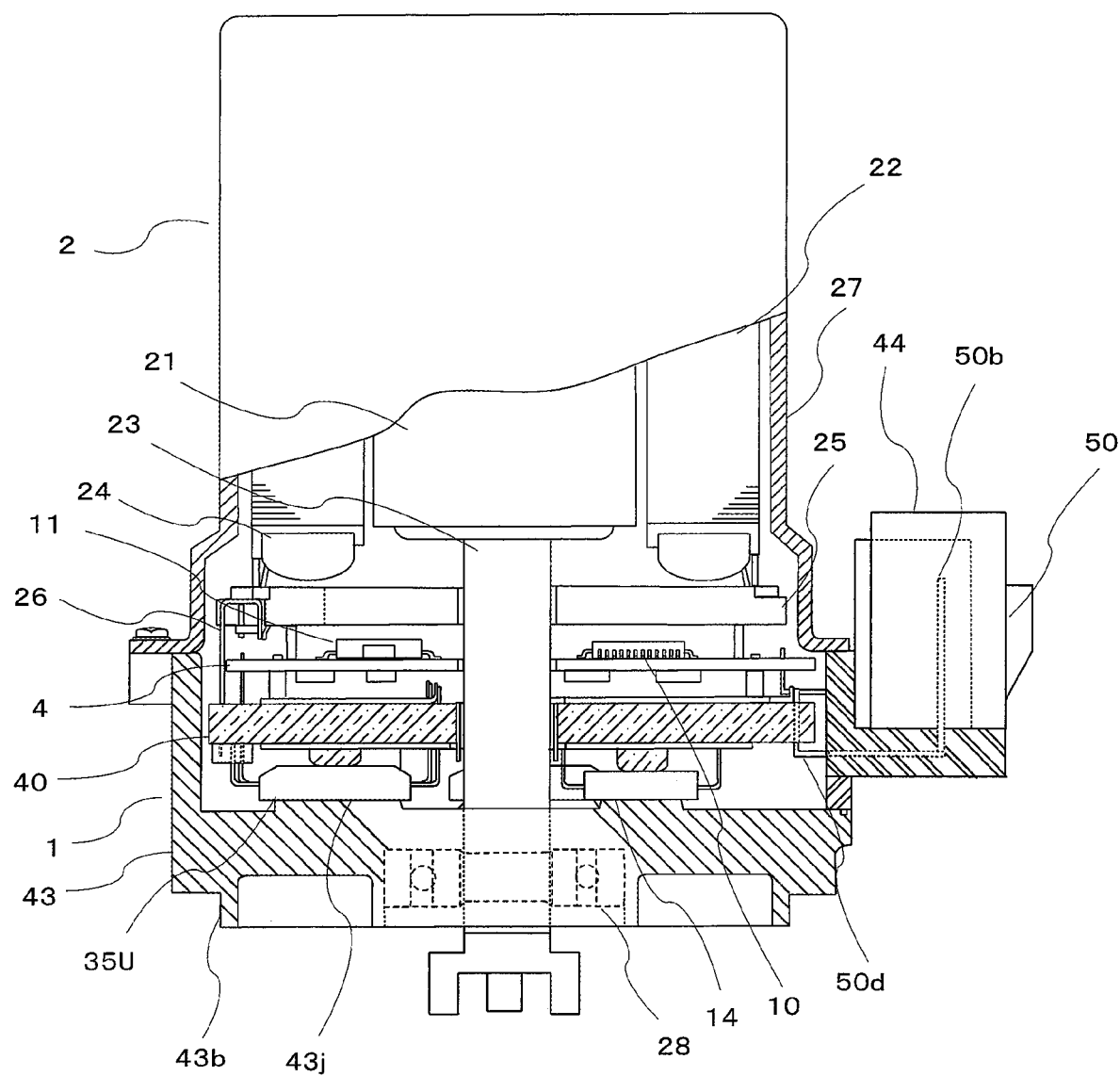
FIG. 11 is a sectional view showing the electric power steering device according to the third embodiment of this invention.

As shown in FIG. 11, the configuration described in the third embodiment of this invention may also be applied to a configuration of the connector 44 in which the capacitors C1, C2 and the coil CL are not installed.

The invention claimed is:

1. A control unit for controlling driving of a motor, the control unit comprising:
a housing that is formed integrally with the motor so as to be coaxial with a motor output shaft of the motor, forms an outer covering of the control unit, and is joined to an end portion of the motor, the housing comprising an extension portion extending in a radial direction of the motor output shaft; and
a connector structure that is disposed in a cutaway portion formed in the housing, and joined to the housing, wherein the connector structure includes:
a connector main body in which a connector is formed;
a terminal including a power supply system and a signal system; and
a component mounting portion including at least one of a capacitor and a coil,
the component mounting portion is provided parallel to the motor output shaft on an exterior of the motor or the housing, and
the at least one of the capacitor and the coil included in the component mounting portion is electrically connected directly to the connector of the connector main body via the terminal, and
the connector structure is removably attached to the extension portion of the housing,
wherein the component mounting portion includes the capacitor and the coil,
wherein the extension portion includes a first recessed portion which houses the capacitor,
wherein the connector structure includes a sensor connector and a second recessed portion which houses the coil, and
wherein the sensor connector is provided on the connector structure without being housed in the first recessed portion and without being housed in the second recessed portion.

2. The control unit according to claim 1, wherein the control unit is disposed on an output side of the motor.

3. The control unit according to claim 1, wherein a positioning portion that extends parallel to the motor output shaft is provided in the cutaway portion of the housing, and
the connector structure includes attachment portions of at least two types, one of the attachment portions being fixed to the extension portion of the housing and the other attachment portion being fitted to the positioning portion.

4. The control unit according to claim 1, wherein the component mounting portion is formed from an identical material to the connector structure, and includes a lid for protecting the at least one of the capacitor and the coil included in the component mounting portion.

5. The control unit according to claim 1, wherein a control board and an inverter circuit are disposed in the housing,
the control unit further comprises a frame serving as an intermediate member provided between the control board and the inverter circuit,
at least two types of connectors, namely a power supply system connector and a signal system connector, are provided in the connector structure,
a terminal of the power supply system connector is connected to a bus bar of the frame, and
a terminal of the signal system connector is connected to the control board.

6. The control unit according to claim 1, wherein a control board and an inverter circuit are disposed in the housing,
the control unit further comprises a frame serving as an intermediate member provided between the control board and the inverter circuit, and
the connector structure and the frame are joined by a fitting structure.

7. The control unit according to claim 5, wherein the connector structure includes attachment portions of at least two types, one of the attachment portions being fixed together with the frame.

8. An electric power steering device constituted by the control unit according to claim 1 and the motor, and generating auxiliary steering torque using the motor.

9. The control unit according to claim 6, wherein the connector structure includes attachment portions of at least two types, one of the attachment portions being fixed together with the frame.

10. The control unit according to claim 1, wherein a groove is provided around the periphery of the extension portion, and
the connector structure is attached to the groove by a sealing material or an adhesive.

11. The control unit according to claim 3, further comprising at least one bolt that fixes the one of the attachment portions to the extension portion.

* * * * *